United States Patent
Lahoreau et al.

(10) Patent No.: US 6,433,559 B1
(45) Date of Patent: Aug. 13, 2002

(54) CAPACITIVE ANGLE SENSOR, IN PARTICULAR FOR MOTOR VEHICLE STEERING COLUMN

(75) Inventors: Franck Lahoreau, Caen; Thierry Fouquet, Montigny-le-Bretonneux, both of (FR)

(73) Assignee: SC2N, Montigny le Bretonneux (FR)

( * ) Notice: Subject to any disclaimer, the term of this patent is extended or adjusted under 35 U.S.C. 154(b) by 0 days.

(21) Appl. No.: 09/423,847

(22) PCT Filed: May 15, 1998

(86) PCT No.: PCT/FR98/00972

§ 371 (c)(1),
(2), (4) Date: Nov. 15, 1999

(87) PCT Pub. No.: WO98/53275

PCT Pub. Date: Nov. 26, 1998

(30) Foreign Application Priority Data

May 16, 1997 (FR) .............................................. 97 06040

(51) Int. Cl.[7] .......................... G01B 7/30; G01D 5/241; B62D 15/02
(52) U.S. Cl. ...................................... 324/658; 73/865.9
(58) Field of Search ................................ 324/658, 660, 324/661, 686, 688, 690; 73/865

(56) References Cited

U.S. PATENT DOCUMENTS

| | | | | |
|---|---|---|---|---|
| 3,732,553 A | | 5/1973 | Hardway, Jr. ........... 340/870.37 |
| 3,845,377 A | * | 10/1974 | Shimotori ................ 324/725 X |
| 4,238,781 A | * | 12/1980 | Vercellotti et al. ........... 324/660 |
| 4,963,829 A | | 10/1990 | Wereb ........................ 324/660 |
| 5,077,635 A | * | 12/1991 | Bollhagen et al. ...... 324/725 X |
| 5,123,279 A | | 6/1992 | Henein et al. ............. 73/118.1 |
| 5,309,758 A | * | 5/1994 | Kubota et al. ............. 73/118.1 |
| 5,598,153 A | * | 1/1997 | Brasseur et al. ........ 324/660 X |
| 6,147,416 A | * | 11/2000 | Mitsuzuka ................. 307/10.1 |
| 6,236,119 B1 | * | 5/2001 | Bonn et al. ................ 307/10.1 |

FOREIGN PATENT DOCUMENTS

| | | | | |
|---|---|---|---|---|
| DE | 3328421 A1 | * | 2/1984 | ............ G01B/7/30 |
| DE | 371062 A1 | * | 10/1988 | ................. 324/660 |
| DE | 42 28 719 | | 3/1994 | ............ G01B/7/30 |
| DE | 44 23 081 | | 1/1996 | ............ G01D/5/20 |
| EP | 0443 940 A2 | | 8/1991 | ............ G01P/3/847 |
| EP | 459118 A1 | * | 12/1991 | ............ G01D/5/24 |
| EP | 0551 066 A1 | | 7/1993 | ............ G01B/7/30 |
| FR | 2 457 003 | | 12/1980 | ............ G01B/7/00 |
| FR | 2 662 503 | | 11/1991 | ................. 324/160 |
| GB | 2176013 | * | 12/1986 | ............ G01B/7/30 |

\* cited by examiner

*Primary Examiner*—Thomas P. Noland
(74) *Attorney, Agent, or Firm*—McCormick, Paulding & Huber LLP

(57) ABSTRACT

The present invention relates to an angle sensor of the capacitive type, in particular for a steering column of a motor vehicle having a stator and rotor element, comprising at least one sensor element (200) of the stator and a transmitter suitable for applying electrical signals to a transmitter one of the elements, and a receiver suitable for detecting the signals received on a receiver one of the elements, which signals depend on the angular position of the rotor element (300) relative to the sensor element (200) of the stator, the sensor being characterized by the fact that the sensor element (200) of the stator is placed in a box (100) organized to be engaged sideways onto the assembly (10, 50) in which the rotor element (300) is received.

55 Claims, 7 Drawing Sheets

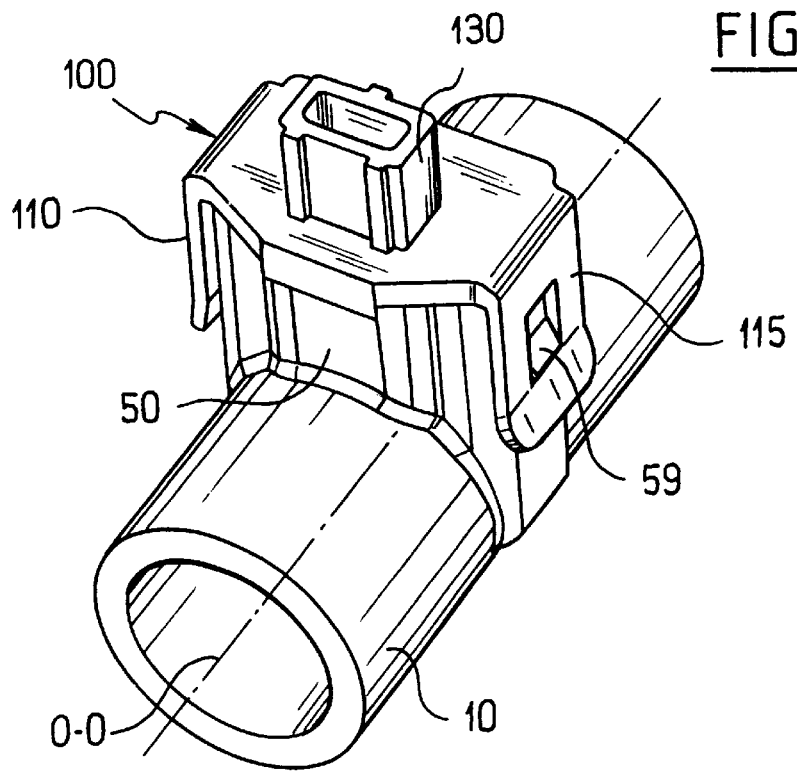
FIG_1
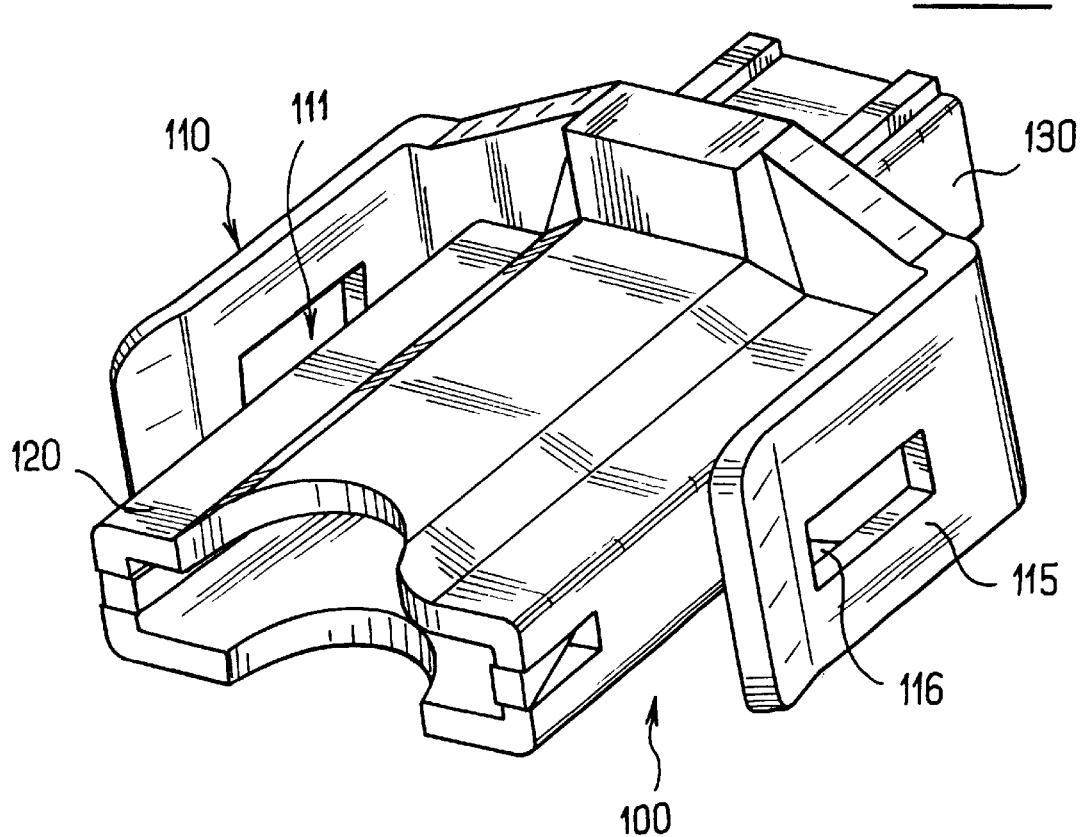
FIG_2

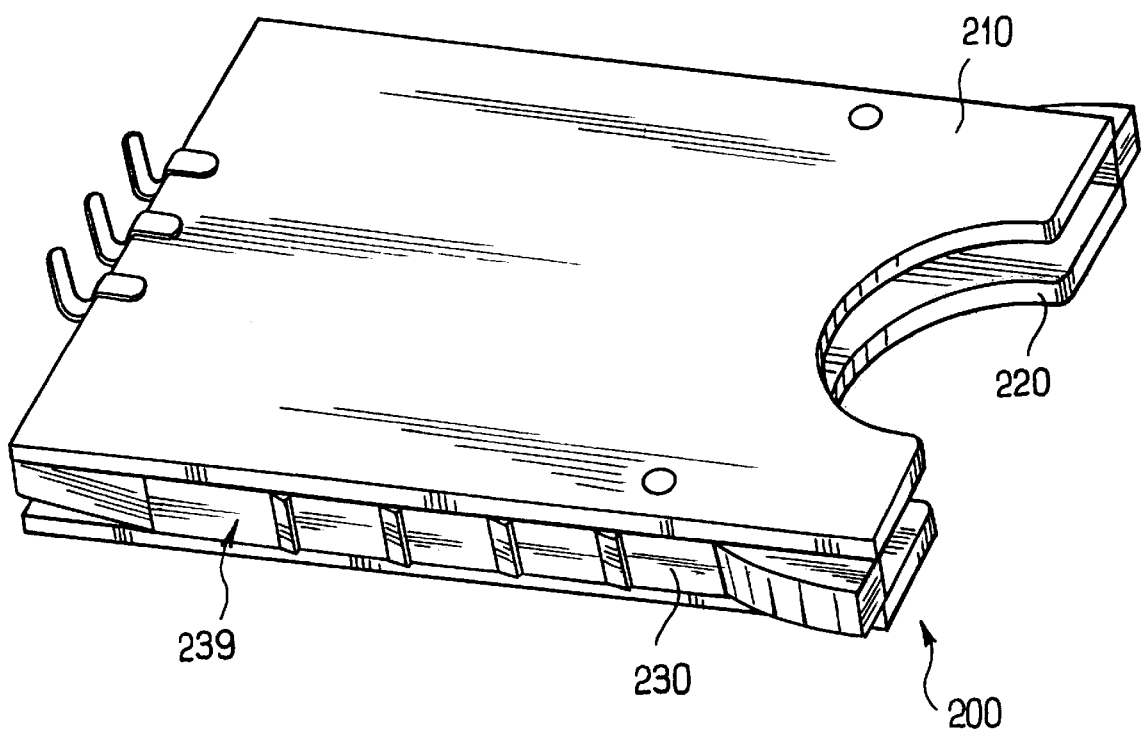
FIG_3
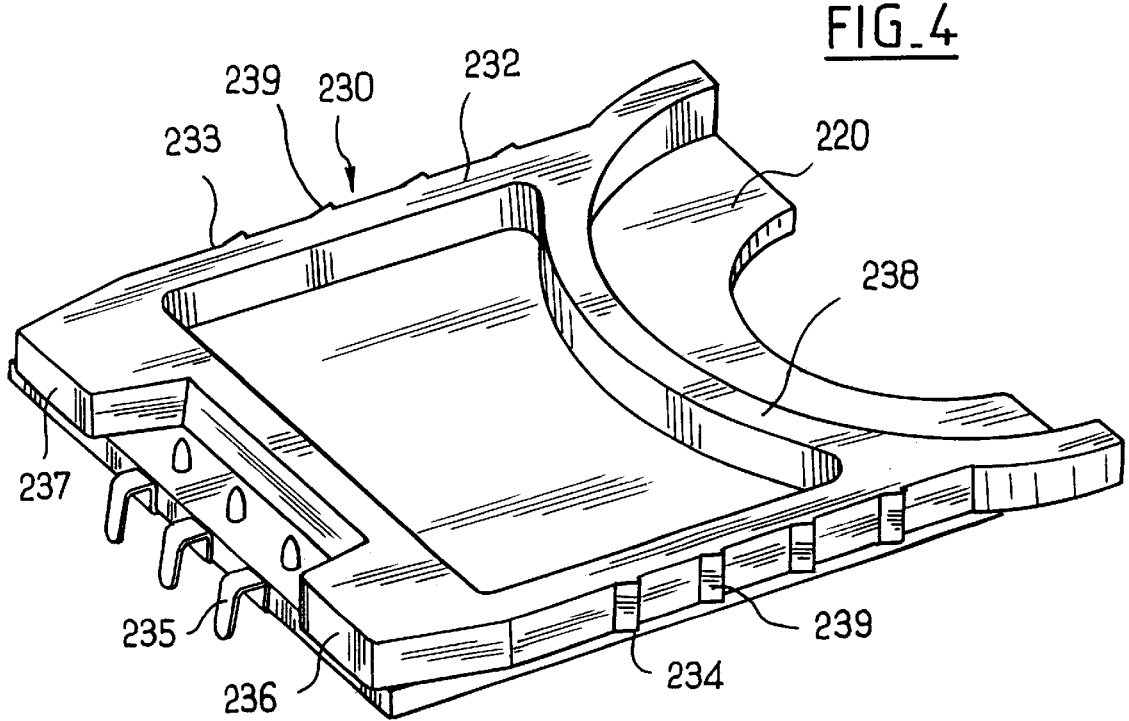
FIG_4

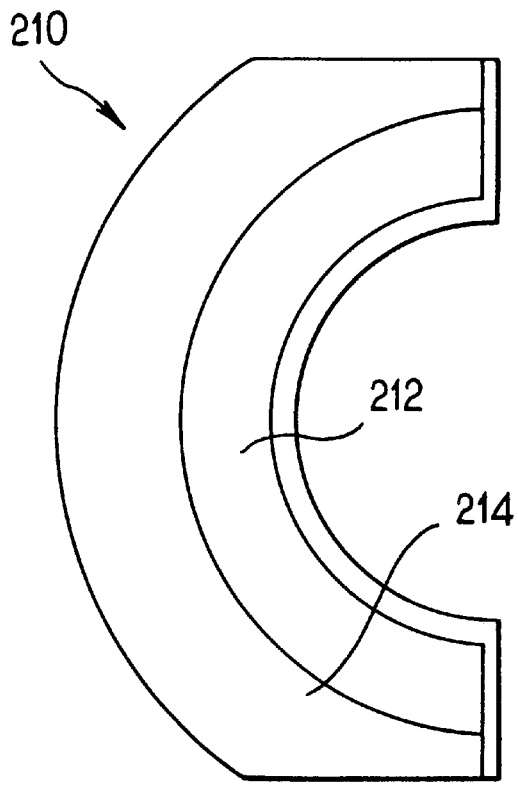
FIG._7
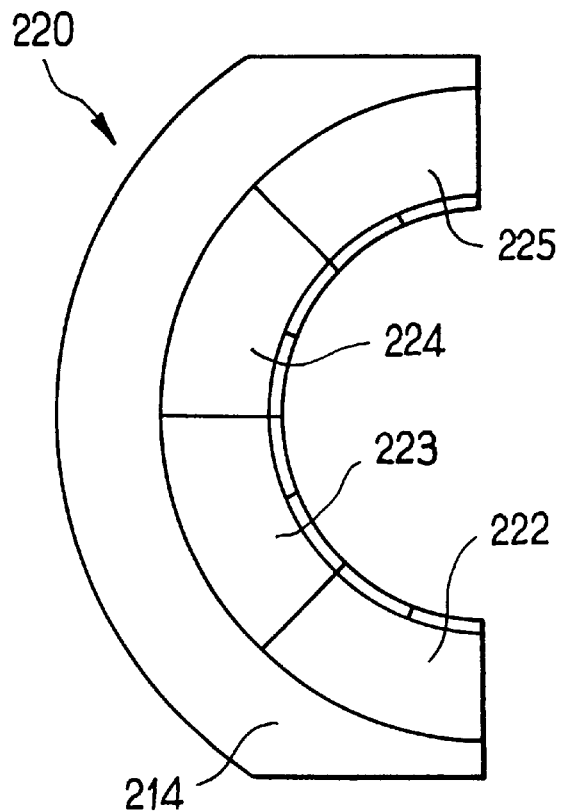
FIG._8

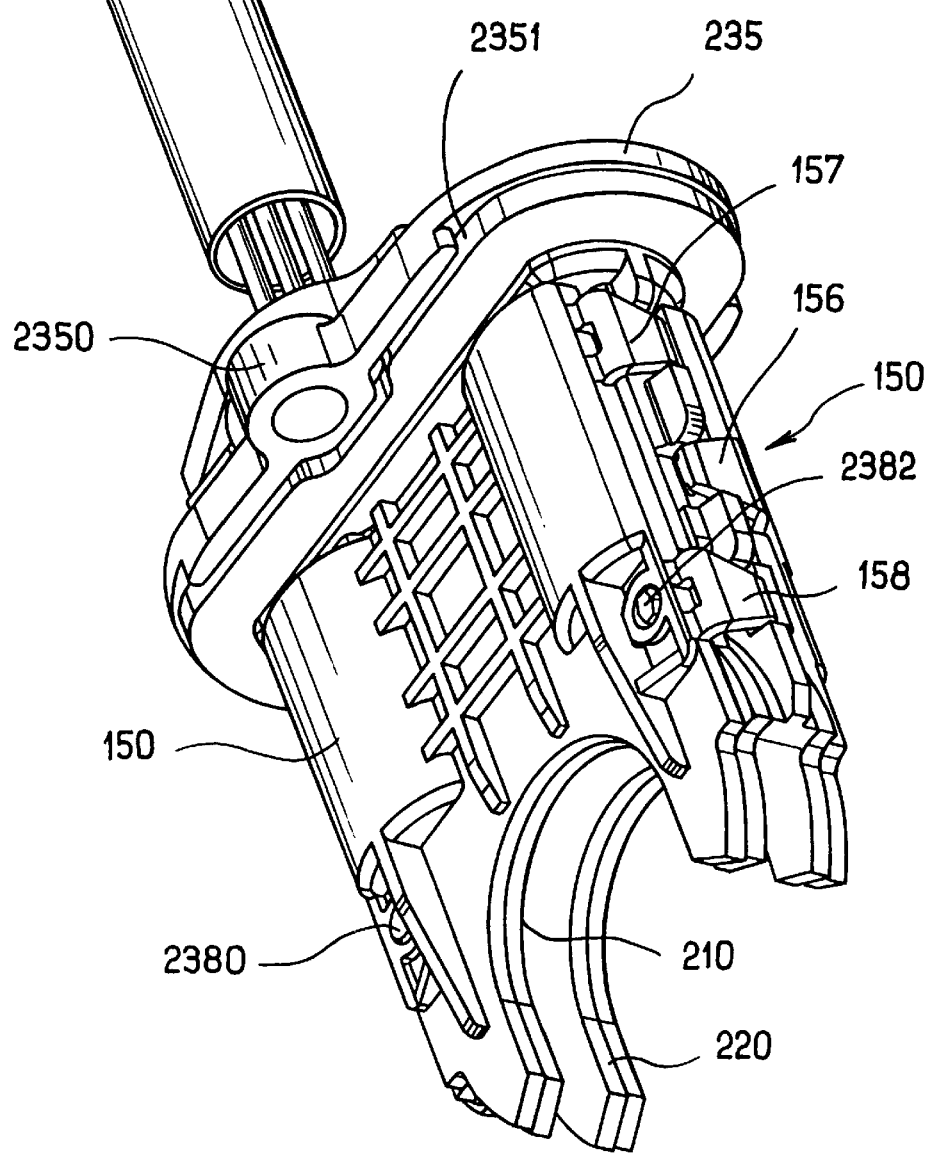
FIG_9

CAPACITIVE ANGLE SENSOR, IN PARTICULAR FOR MOTOR VEHICLE STEERING COLUMN

The present invention relates to the field of contact-free angle sensors.

It is particularly applicable to angle sensors designed to be installed on the steering column of a motor vehicle.

More precisely, the present invention preferably relates to angle sensors based on capacitive sensors.

BACKGROUND OF THE INVENTION

Numerous angle sensors based on capacitive sensors have already been proposed.

Examples of such sensors can be found in Documents U.S. Pat. No. 3,845,377, EP-0459118, DE-3711062, GB-2176013, DE-3328421, U.S. Pat. No. 4,238,781, FR-2457003, U.S. Pat. No. 3,732,553, EP-0551066.

Most of those sensors comprise a rotor element, at least one stator element, means suitable for applying electrical signals to a transmitter one of the elements, and means suitable for detecting the signals received on a receiver one of the elements, which signals depend on the angular position of the rotor element relative to the stator element.

An object of the present invention is to improve known angle sensors.

This object is achieved in the context of the present invention by means of an angle sensor, in particular for a steering column of a motor vehicle, in which the sensor element of the stator is placed in a box organized to be engaged sideways onto the assembly in which the rotor element is received.

SUMMARY OF THE INVENTION

According to an advantageous characteristic of the present invention, the sensor element of the stator is provided with at least one electrode which extends over an angle of about 180°.

According to another advantageous characteristic of the present invention, the sensor element of the stator is provided with two parallel electrodes which extend over an angle of about 180°, which electrodes are organized to receive the rotor element between them.

Other characteristics, objects, and advantages of the invention will appear on reading the following detailed description with reference to the accompanying drawings which are given by way of non-limiting example, and in which:

BRIEF DESCRIPTION OF THE DRAWINGS EMBODIMENT

FIG. 1 is an external perspective view of a sensor of the present invention;

FIG. 2 is an external perspective view of a box of the present invention containing a sensor element of the stator;

FIG. 3 is a perspective view of such a sensor element of the stator of the present invention;

FIG. 4 is an exploded fragmentary view of such a sensor element of the stator;

FIG. 7 is a plan view of a first stator electrode of the present invention;

FIG. 8 is a plan view of a second stator electrode of the present invention;

FIG. 9 is a perspective view of a variant of a sensor of the present invention;

DETAILED DESCRIPTION OF THE PREFERRED EMBODIMENT

Figure 5:
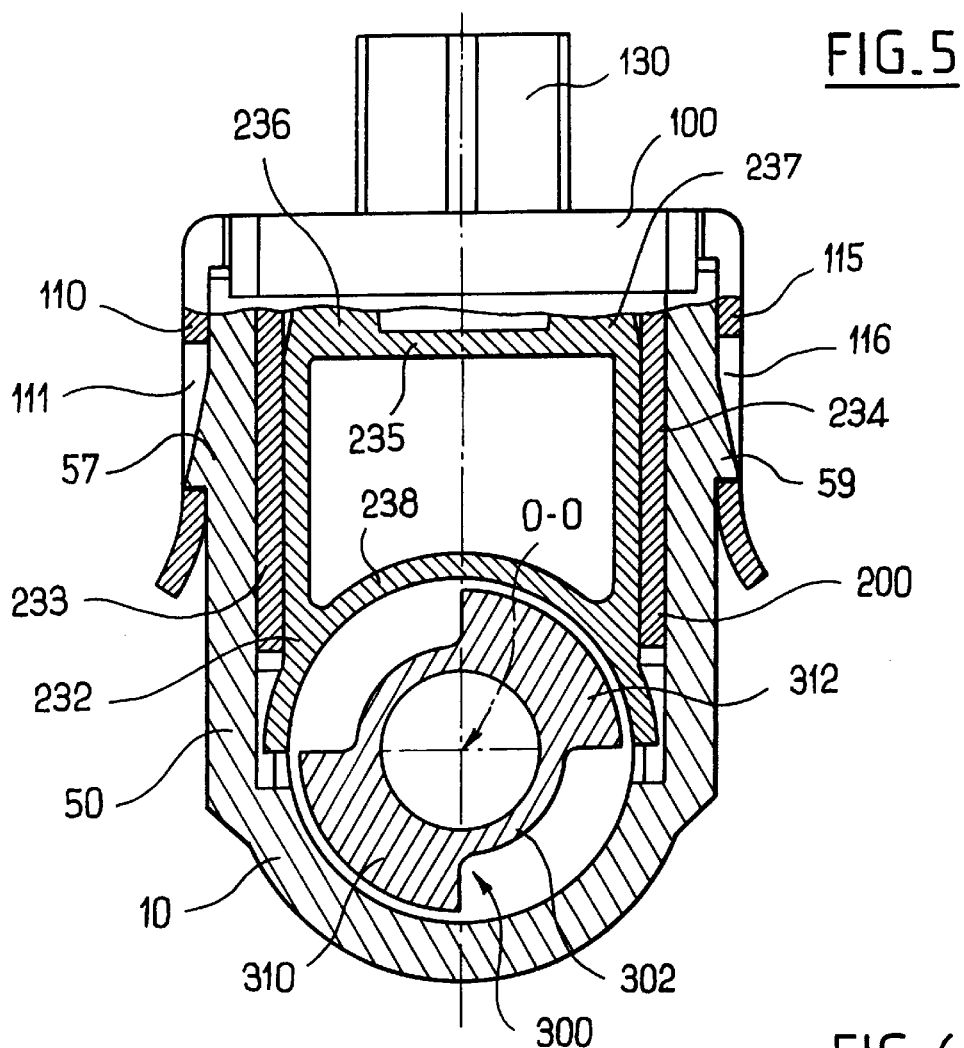
FIG. 5 is a cross-section view of a sensor of the present invention.
Figure 6:
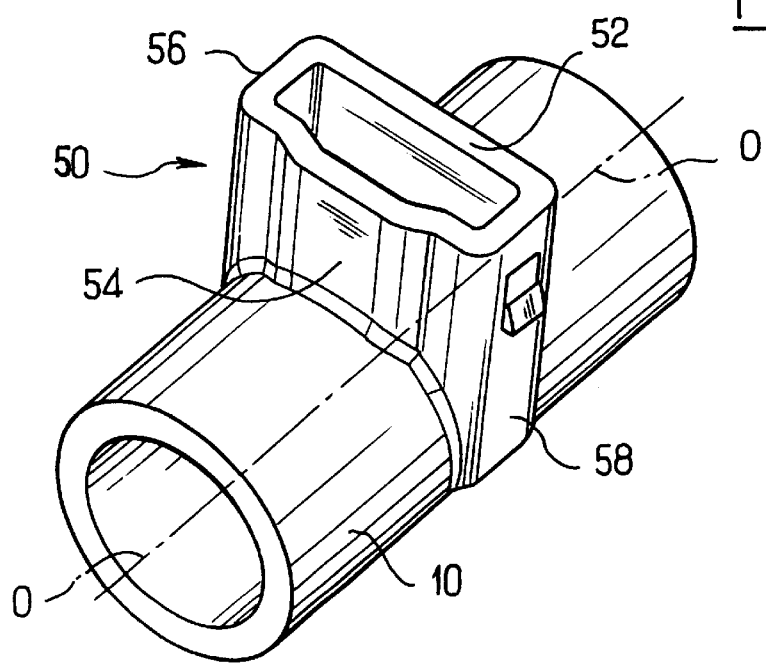
FIG. 6 is a perspective view similar to FIG. 1 after the box containing the sensor element of the stator has been removed.
Figure 10:
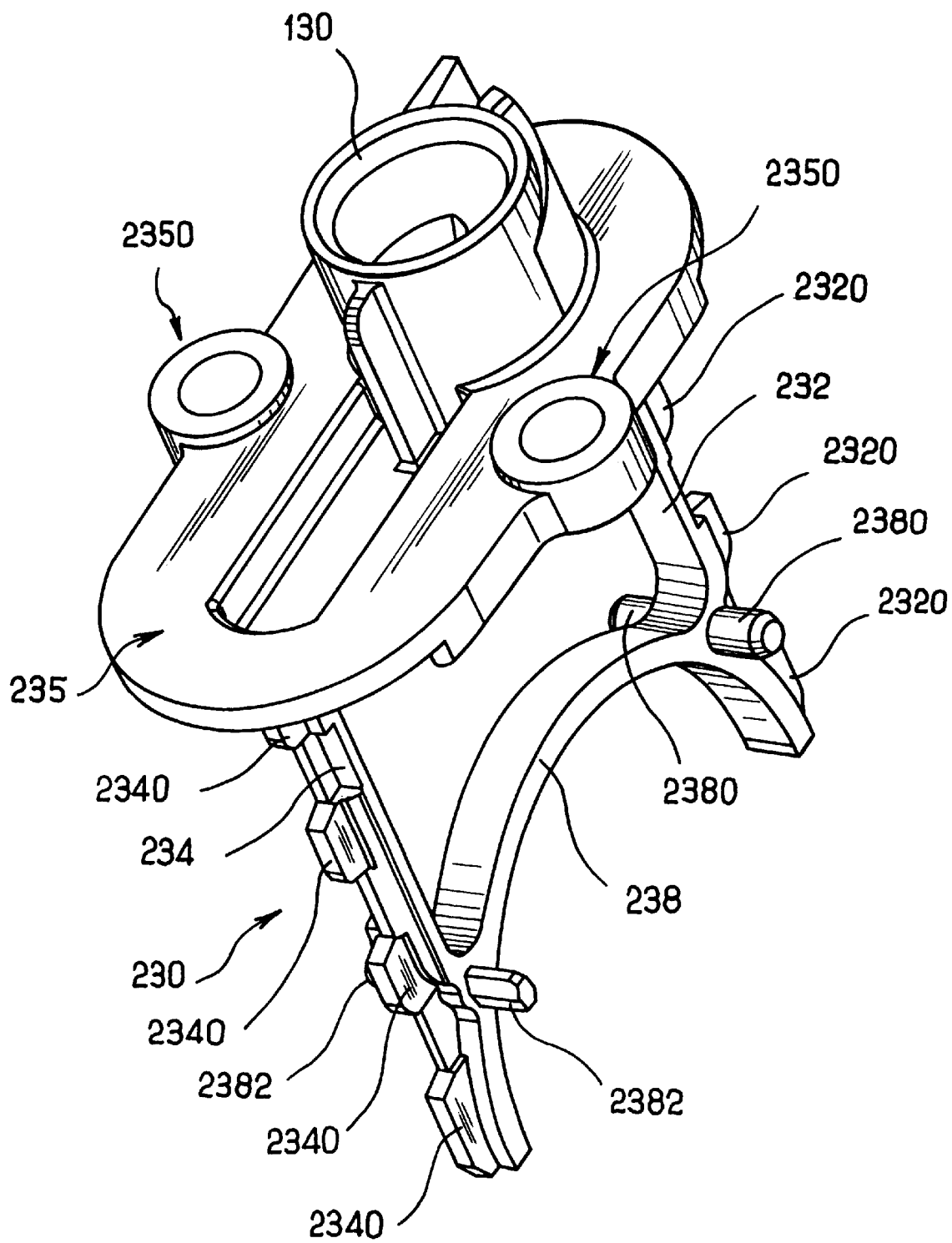
FIG. 10 is a similar view of a support-forming and shielding-forming spacer designed for this variant of the present invention.

The sensor of the present invention shown in the accompanying figures is suitable for being assembled onto a steering column of a motor vehicle.

The accompanying figures show a segment of steering column 10 on which the sensor of the present invention is installed.

This sensor comprises a box 100 which receives a sensor element 200 of the stator and a rotor 300 placed in a column segment 10.

Numerous embodiments are possible for the rotor 300. It is preferably formed by an electrically non-conductive piece advantageously made of a material having high dielectric permittivity, set on the steering shaft.

However, in a variant, the rotor may be formed of an electrically-conductive material, e.g. it may be made of metal.

In a particular and non-limiting embodiment shown in the accompanying figures, the rotor 300 is provided with two protuberances 310, 312 diametrically opposite each other on a hub 302 constrained to rotate with the steering shaft. Each protuberance 310, 312 preferably covers an angle of about 90°. The outside periphery of each protuberance 310, 312 is defined by a circularly symmetrical cylindrical sector centered on the axis of rotation O—O of the rotor 300.

As shown in the accompanying figures, the two protuberances 310, 312 are formed of plane ring sectors perpendicular to the axis of rotation O—O, and each of them typically covers an angle of 90°.

The column segment 10 is constituted by a circularly-symmetrical cylinder centered on the same axis O—O.

The cylindrical segment 10 is also provided with a side cage 50 which extends transversely to the axis O—O. the cage 50 opens out both radially inwards inside the segment 10, and also radially outwards. The cage 50 is organized to receive the box 100 and the stator element 200 received therein.

The cage 50 is made up of two main walls 52, 54 that are generally mutually parallel and perpendicular to the axis O—O, and of two secondary walls 56, 58 perpendicular to the main walls 52, 54, and parallel to each other and to the axis O—O.

It should also be noted that, in the embodiment shown in accompanying FIGS. 1 to 8, the outside surface of each of the two secondary walls 56 and 58 is provided with a tooth 57, 59. These teeth serve to receive snap-fastening catches 110, 115 integral with the box 100.

Other means of assembly, such as screw means, may be considered.

In the embodiment shown in FIGS. 1 to 8, the box 100 comprises a hollow central body 120 that is generally rectangular block shaped and that is provided with the two above-mentioned catches 110, 115.

The body 120 has a right cross-section that is generally rectangular and that is complementary to the inside empty section of the cage 50.

The catches 110, 150 are disposed along the small sides of the body 120. As shown in the accompanying figures, each of the catches 110, 150 is provided with an opening 111, 116 that is complementary to a tooth 57, 59. In addition, the catches 110, 150 diverge going towards their free ends, so as to facilitate engaging them over the cage 50.

That end of each of the main walls of the body 120 which is designed to be engaged into the cage 50 has a generally semi-cylindrical concave outline.

On its opposite end that remains accessible from the outside of the cage 50, the body 120 preferably has a connector box 130.

As shown in the accompanying figures, the body 120 and the cage 50 may be of cross-section that is not symmetrical about a plane orthogonal to the axis O—O. this asymmetry may be formed, for example, by a longitudinal hump 122 on one of the main faces of the body 120. This asymmetry forms keying means.

Numerous embodiments are possible for the sesnor element 200 of the stator. In the preferred embodiment shown in the accompanying figures, the element 200 essentially comprises two parallel printed circuits 210, 220 separated by a spacer 230.

As shown in FIG. 7, one of the printed circuits (210) is provided with an electrode 212 in the form of a ring sector of about 180°. This electrode 212 is preferably surrounded by a guard electrode 214.

The second printed circuit 220 comprises a series of adjacent electrode sectors which combine to cover an area substantially equal to the area of the electrode 212. In the preferred embodiment shown in FIG. 8, the second printed circuit 220 comprises four adjacent ring sectors 222, 223, 224, and 225, each of which covers an angle of about 45°. In another variant, eight 22.5° sectors are provided.

Thus, the above-mentioned electrodes 212, 222, 223, 224, 225 are formed of plane ring sectors perpendicular to the axis of rotation O—O.

The spacer 230 is preferably made of an alloy that is electrically conductive, e.g. aluminum or Zamak (a zinc alloy for die-casting). It is formed of a frame 232 made up of two longitudinal main beams 233, 234 and two cross beams 235 and 238.

The main beams 233 and 234 are rectilinear and mutually parallel. They are placed between the longitudinal edges of the printed circuits 210 and 220.

The cross beam 235 is close to the transverse edges of the printed circuits 210 and 220 outside the cage 50. However, the cross beam 235 is preferably placed set-back from said transverse edges of the printed circuits 210 and 220 as shown in FIG. 4. In addition, the cross beam 235 is provided with two projections 236, 237 on its outside surface and in the vicinity of its ends. These projections 236 an 237 may serve as abutments for setting the stator element 200 in the box 100.

As shown in FIGS. 3 and 4,in order to hold the stator element 200 stationary in the box 100, the outside surfaces of the longitudinal beams 233 and 234 are preferably provided with serrations 239 suitable for engaging with the inside surface of the box 100 when the stator element 200 is inserted therein.

The cross beam 238 is disposed in the vicinity of those ends of the printed circuits 210 and 220 which are adjacent to the rotor 300. The cross beam 238 is in the general shape of a half-cylinder of radius greater than the radius of the semi-cylindrical edges of the printed is circuits 210 and 220.

The electrodes 212 and 222, 223, 224, and 225 that are semi-cylindrical in general shape are placed between said semi-cylindrical edges of the printed circuits 210, 220 and the semi-cylindrical cross beam 238.

In addition, the inside and outside radii of these electrodes 212 and 222, 223, 224, 225 are at least substantially equal respectively to the inside and outside radii of the protuberances 310 and 312 on the rotor 300.

The components of the electronic circuit for processing the electrical signals from the sensor may be carried by one of the printed circuits 210 and 220 and received in the volume defined between them by the spacer 230. In association with the printed circuits 210 and 220, the spacer then provides shielding against external interference of electrical or magnetic type. One or more additional beams may be added to separate the locations for the components, serving as an additional Faraday cage to isolate the very sensitive elements from the interfering components.

The input/output terminals of this circuit are accessible in the connector box 130 and are preferably placed between the abutments 236 and 237 on the spacer 230, as shown in FIG. 4.

The printed circuits 210 and 220 may be assembled onto the spacer 230 by any suitable means, e.g. by riveting.

Preferably, the box 100 and the cage 50 are made of molded plastic.

To assemble the sensor of the present invention, it is necessary merely to set the assembly forming the stator element and made up of the two printed circuits 210, 220 and of the spacer 230 inside the box 100 (the stator element 200 is held stationary inside the box 100 by the serrations 239), and then to engage the body 120 into the cage 50 until the openings 111, 116 in the catches 110 and 115 receive the teeth 57 and 59.

The rotor is then placed between the two printed circuits 210 and 220 so that it modifies the coupling between the electrodes 212 and 222, 223, 224, 225 depending on its angular position.

Preferably a sealing gasket is interposed between the opening outline of the cage 50 and the box 100.

The signals applied to the stator element 200 may be generally as described in any one of the above-mentioned prior art documents, namely U.S. Pat. No. 3,845,377, EP-0459118, DE-3711062, GB-2176013, DE-3328421, U.S. Pat. No. 4,238,781, FR-2457003, U.S. Pat. No. 3,732, 553, EP-0551066.

Thus, for example, it is possible to provide general means for applying excitation signals such as those defined in document EP-A-0551066 to the electrodes 222, 223, 224, 225, and suitable means for detecting the electrical signals received correspondingly on the electrode 212. The amplitude and the form of the signals received on the electrode 212 depends on the coupling between the stator electrodes, and therefore on the position of the rotor.

Naturally, the present invention is not limited to the above-described embodiment, but rather it extends to any variants lying within its spirit.

Compared with other capacitive-type angle sensors known to the Applicant, which sensors all have stator structures that are circularly symmetrical, the sensor of the present invention offers the advantage of making it possible for the stator structure to be plugged in from the side, thereby making assembly/disassembly very easy whether it be for original assembly on the production line, or for a subsequent maintenance operation.

The angle sensor of the present invention may be used, for example, for electronic stability management: in an intelligent differential and/or ABS system, for controlling an electronic navigation system, active suspension, etc.

In another variant, each of the column segment 10 and of the box 100 may be formed of two complementary and generally semi-cylindrical shells.

The structure of the second embodiment of the present invention is described below with reference to FIGS. 9 to 12.

In these figures, elements performing the same functions as the elements described above in the context of the first embodiment and with reference to FIGS. 1 to 8 bear identical reference numerals.

Essentially, the second embodiment of the sensor shown in FIGS. 9 to 12 comprises a shielding-forming spacer 230, two printed circuits 210, 220 defining the stator electrodes, and carried on opposite faces of the spacer 230, two box covers 150 which hold the printed circuits 210, 220 against the spacer, and a rotor 300 (the rotor is not shown in the accompanying figures in order to simplify the drawings).

The second embodiment differs from the above-described first embodiment mainly by the fact that, in the second embodiment shown in FIGS. 9 to 12, the box 100 comprises no more than the two covers 150 which hold the printed circuit boards 210, 220 against the spacer 230. Thus, in the second embodiment, the electrical connector, as well as the functions of mechanical fixing to and sealing relative to the cage 50 of the steering column are provided by the spacer 230 rather than by the box 100.

The spacer 230 is made of an electrically conductive material for forming shielding. It is preferably made of cast Zamak.

In a manner comparable to the first embodiment, the spacer 230 is formed of a frame made up of two longitudinal beams 232 and 234 and of two cross beams 235, 238.

In the second embodiment shown in FIGS. 9 to 12, the outer beam 235 is in the form of a base substantially perpendicular to the longitudinal beams 232 and 234. The base 235 carries the electrical connector 130 which projects from its outside face.

The base 235 is further provided with two bores 2350 that are parallel to each other and to the longitudinal beams 232, 234. The bores 2350 serve to receive screws or equivalent fixing means that engage in complementary taps formed in the cage 50 for the purpose of fixing the sensor.

In the particular embodiment shown in FIGS. 9 to 12, and whose geometrical shape is not limiting, the base 235 is oblong in shape, of the race-course type shape.

Preferably, the inside face of the base 235 is provided with a groove 2351 suitable for receiving a gasket providing sealing between the sensor and the cage 50.

It should be noted that, by means of the structure proposed in the context of the second embodiment, the shielding-forming spacer 230 comes directly into contact with the cage 50, in particular at the outer base 235. This disposition makes it possible to improve the performance of the sensor, in particular by limiting the risk of electromagnetic interference influencing the processing components received in the chamber inside the spacer 230.

In the context of the second embodiment, the electrical connector 130 carried by the base 235 is preferably provided with structures suitable for receiving and holding stationary the complementary connector element in the manner of a bayonet mounting Preferably, the connector 130 is also provided with keying means.

The flanks of the longitudinal beams 232, 234 are not provided with serrations 239 serving to anchor in the box 100, unlike in the first embodiment. But the flanks of the longitudinal beams 232, 234 are provided with projecting studs 2320, 2340 (e.g. pyramid shaped) designed to rest on the inside face of the complementary recess provided in the cage 50.

It should also be noted that, in the embodiment shown in FIGS. 9 to 12, the spacer 230 is provided with two pairs of studs 2380, 2382 projecting respectively from its opposite main faces.

The studs 2380 are of cylindrical outline. They are disposed in alignment, and they are connected to the spacer 230 at the junction zone where the half-cylinder beam 238 meets the longitudinal beam 232.

The studs 2382 are of polygonal section, e.g. of hexagonal section. They are also in alignment and they are connected to the spacer 230 at the junction zone where the beam 238 and the second longitudinal beam 234 meet.

These studs 2380, 2382 serve to hold and to position the covers 150 and the printed circuit boards 210, 220.

As indicated above, in the second embodiment, the box 100 is made up of two covers 150 designed to hold the printed circuit boards 210, 220 forming stator electrodes against the opposite main faces of the spacer 230, and more precisely the portions of these main faces that are situated downstream from the base 235.

Thus, the general shape of each cover 150 corresponds to the shape of the spacer 230 defined by the longitudinal beams 232, 234 and the cross beam 238. It should however be noted that each cover 150 preferably extends beyond the cross beam 238 over an amplitude equal to the amplitude of the active electrode segments formed on the printed circuits 210, 220 beyond the cross beam 238, as shown in FIG. 9.

Thus, essentially, each cover 150 is in the general shape of a rectangle whose area is equal to the chamber defined by the longitudinal beams 232, 234, which rectangle is extended inwardly by a generally semi-circular arch that is concave facing outwards and is of the same radius as the associated ends of the printed circuits 210, 220.

Preferably, the two covers 150 that are used are identical. They are preferably made of molded plastic.

The covers 150 are provided with holes 152, 154 serving to receive the above-mentioned positioning studs 2380, 2382.

Figure 11:
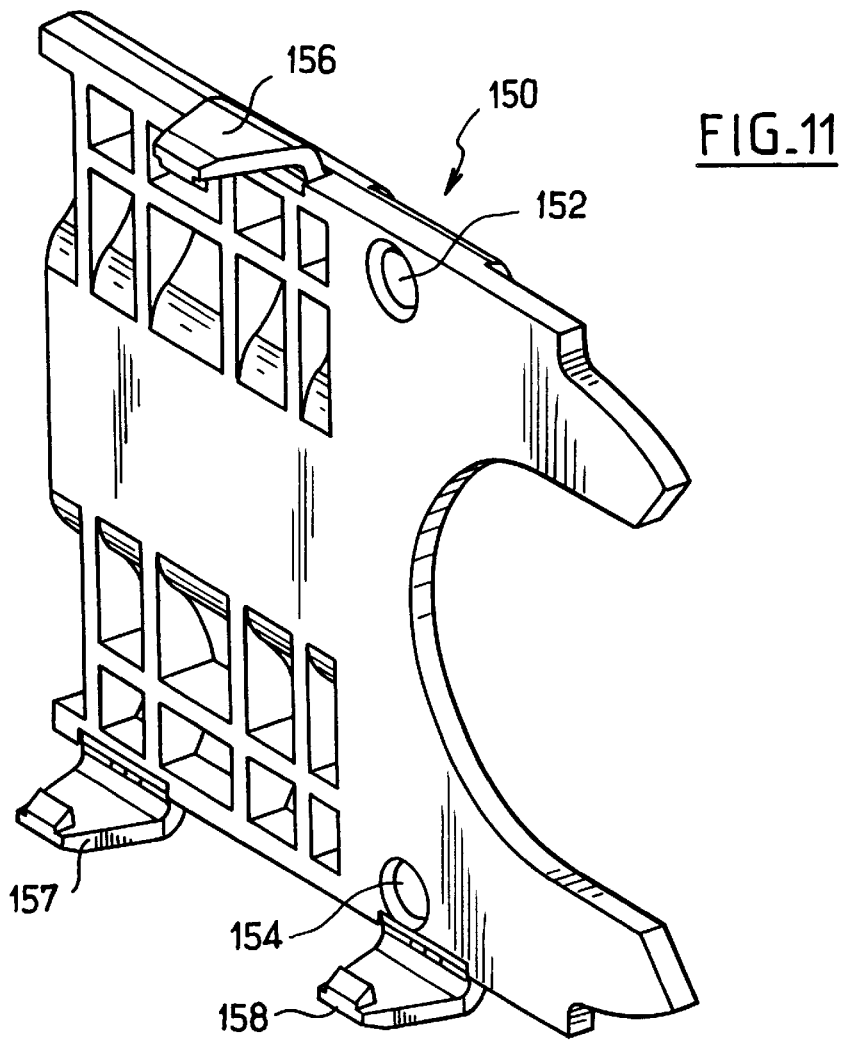
FIG. 11 is a perspective view of a box cover for this variant of the present invention.

The covers 150 are held stationary on the spacer 230 (with the printed circuits 210, 220 being interposed) by any suitable means. Preferably, the covers 150 are held stationary by snap-fastening. To this end, as shown in FIG. 11, one side edge of each cover 150 is preferably provided with a snap-fastening tooth 156 situated substantially half way along said side edge, and the other side edge of each cover is provided two snap-fastening teeth 157 situated respectively in the vicinities of the ends of said side edge. Thus, when the two identical covers 150 are assembled together, the central tooth 156 on one of the covers comes into engagement with a setback provided between the two teeth 157, 158 of the second cover, and said two teeth themselves come into engagement with setbacks provided for this purpose respectively on either side of said central tooth 156 (see FIG. 9, in particular).

Figure 12:
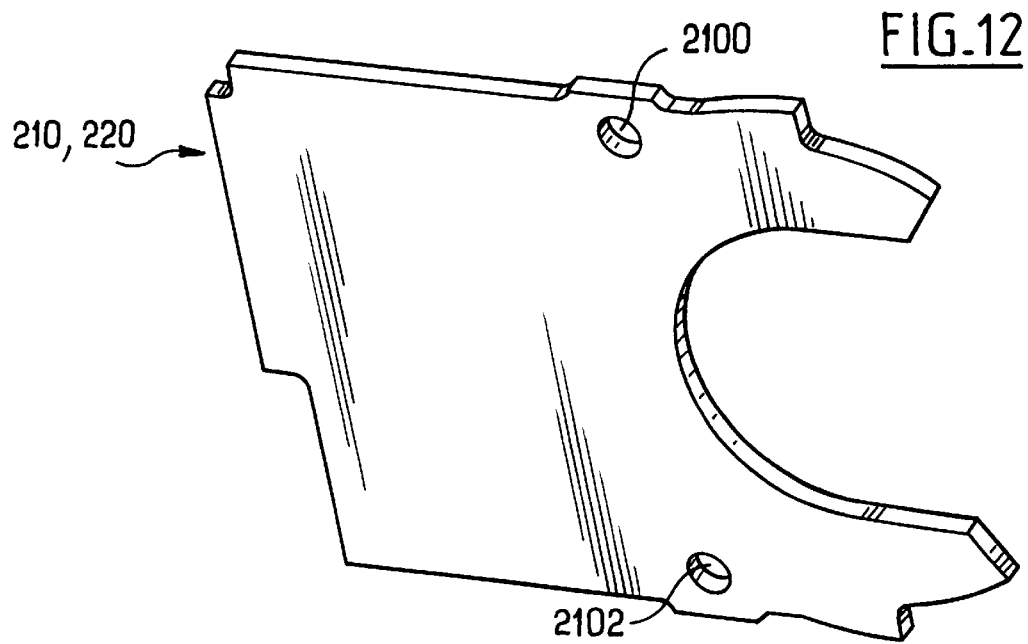
FIG. 12 shows a printed circuit board carrying electrodes, for the same variant of the present invention.

FIG. 12 shows an embodiment of a printed circuit 210, 220. The external outlines of both of the printed circuits 210, 220 are preferably identical. This outline corresponds generally to that of the covers 150 (i.e. it is a generally rectangular outline corresponding to the chamber defined by the longitudinal beams 232, 234 extended by a substantially semi-circular arch). As shown in FIG. 12, each of the printed circuits is provided with through holes 2100, 2102 serving to receive the positioning studs 2380, 2382.

However, as indicated above, the electrodes provided respectively on the two printed circuits 210, 220 are different from one circuit to the other. The electrodes are preferably respectively as shown in FIGS. 7 and 8.

Thus, the printed circuit 210 is preferably provided with a plane electrode 212 that is perpendicular to the axis of rotation O—O, and that is in the form of a ring sector extending over an angle of at least about 180°. This electrode 212 may be surrounded by a guard electrode 214.

The printed circuit 220 is preferably provided with four adjacent plane electrodes 222, 223, 224, 225 that are perpendicular to the axis of rotation O—O and that are in the form of ring sectors, each of which extends over an angle of about 45°. The electrodes 222, 223, 224, 225 may be surrounded by a guard electrode 214.

The rotor 300 may be generally as described above for the first embodiment, i.e. it may, for example, be provided with two protuberances 310, 312 that are diametrically opposite and in the form of plane ring sectors, each of which extends over an angle of 90° and is perpendicular to the axis of rotation O—O.

The second embodiment of the sensor is assembled essentially as follows. The electronic processing means are positioned in the chamber defined by the spacer 230 and are connected both to the connector 130 and to the respective electrodes provided on the printed circuit 210, 220. Since the printed circuits are pressed against the main faces of the spacer 230, it is necessary merely to snap-fasten the two covers 150 to hold the above-mentioned circuits 210, 220 stationary.

The second embodiment of the sensor operates substantially identically to the embodiment described above with reference to FIGS. 1 to 8.

We claim:

1. An angle sensor of the capacitive type for a steering column of a motor vehicle, said steering column including a stator and a rotor element (300), said angle sensor comprising at least one sensor element (200) of the stator, transmitter means suitable for applying electrical signals to one of the elements, and receiver means suitable for detecting the signals received on one of the elements, which signals depend on the angular position of the rotor element (300) relative to the sensor element (200) of the stator, said sensor being characterized by the fact that the sensor element (200) of the stator is placed in a box (100) organized to be engaged sideways onto an assembly (10, 50) in which the rotor element (300) is received.

2. A sensor according to claim 1, characterized by the fact that the sensor element (200) of the stator is provided with at least one electrode (212; 222, 223, 224, 225) which extends over an angle of about 180°.

3. A sensor according to claim 1, characterized by the fact that the sensor element (200) of the stator is provided with two parallel electrodes (212; 222, 223, 224, 225) which extend over an angle of about 180°, which electrodes (212; 222, 223, 224, 225) are organized to receive the rotor element (300) between them.

4. A sensor according to claim 3, characterized by the fact that the rotor element (300) is placed in a segment (10) of the steering column, which segment is provided with a side cage (50) organized to receive the box (100) receiving the sensor element (200) of the stator.

5. A sensor according to claim 4, characterized by the fact that the cage (50) is provided with teeth (57, 59) serving to receive snap-fastening catches (110, 115) integral with the box (100) in which the stator element (200) is received.

6. A sensor according to claim 1, characterized by the fact that a column segment (10) receiving the rotor element (300) and the box receiving the sensor element of the stator are made up of complementary shells.

7. A sensor according to claim 1, characterized by the fact that the rotor element (300) is formed of an electrically non-conductive piece set onto the steering column.

8. A sensor according to claim 1, characterized by the fact that the rotor element (300) is formed of an electrically non-conductive piece made of metal, and set onto the steering column.

9. A sensor according to claim 1, characterized by the fact that the rotor element (300) is provided with two protuberances (310, 312) that are diametrically opposite on a hub (302) constrained to rotate with the steering shaft, each protuberance (310, 312) covering an angle of about 90°.

10. A sensor according to claim 1, characterized by the fact that the box (100) comprises a central hollow body (120) that is generally rectangular block shaped, that receives the stator element (200), and that is provided with two catches (110, 115) serving to fix the sensor to the steering column.

11. A sensor according to claim 1, characterized by the fact that the sensor element (200) of the stator is provided with a first electrode (212) in the form of a ring sector of about 180°, and a second electrode in the form of a plurality of adjacent ring sectors (222, 223, 224, 225) superposed on the first electrode and having the same angular amplitude as said first electrode.

12. A sensor according to claim 11, taken in association with claim 12, said sensor being characterized by the fact that the electrodes (212, 222, 223, 224, 225) are placed on respective ones of the printed circuits (210, 220).

13. A sensor according to claim 11, characterized by the fact that the second electrode is made up of four adjacent ring sectors (222, 223, 224, and 225), each of which covers an angle of about 45°.

14. A sensor according to claim 11, characterized by the fact that the second electrode is made up of eight adjacent ring sectors, each of which covers an angle of about 22.5°.

15. A sensor according to claim 1, characterized by the fact that the stator (200) is made up of two parallel printed circuits (210, 220) separated by a spacer (230).

16. A sensor according to claim 15, characterized by the fact that the spacer (230) is made of an electrically conductive material.

17. A sensor according to claim 15 or 16, characterized by the fact that the spacer (230) is formed of a frame (232) made up of two longitudinal main beams (233, 234) and of two cross beams (235, 238).

18. A sensor according to claim 17, characterized by the fact that one of the cross beams (235) is placed set back from a transverse edge of the printed circuits (210 and 220), and provided with two projections (236, 237) on its outside surface and in the vicinity of its ends so as to serve as abutments for setting the stator element (200) in the box (100).

19. A sensor according to claims 15 or 16, characterized by the fact that the outside surfaces of the longitudinal beams (233 and 234) are provided with serrations (239) suitable for engaging the inside surface of the box (100) when the sensor element (200) of the stator inserted therein.

20. A sensor according to claims 15 or 16, characterized by the fact that the cross beam (238) disposed in the vicinity of those ends of the printed circuits (210 and 220) which are adjacent to the rotor (300) is in the general shape of a half-cylinder placed on the outsides of the electrodes (212 and 222, 223, 224, 225).

21. A sensor according to claims 15 or 16, said sensor being characterized by the fact that the components of the electronic circuit that process the electrical signals from the sensor are carried by at least one of the printed circuits (210 and 220), and they are received in the volume defined between said printed circuits by the spacer (230).

22. A sensor according to claims 15 or 16, characterized by the fact that it includes the spacer (230) is made of an electrically conductive material and situated between two series of stator electrodes (212; 222, 223, 224, 225), which spacer is provided with an end base (235) organized to rest on the end of a cage (50) that is secured to the column.

23. A sensor according to claim 22, characterized by the fact that the base (235) of the spacer (230) is provided with fixing means for fixing it to the cage (50) on the column.

24. A sensor according to claim 23, characterized by the fact that the base (235) of the spacer (230) is provided with two through holes (2350) for receiving fixing screws.

25. A sensor according to claim 24, characterized by the fact that the spacer is formed of beams (232, 234, 238) defining a chamber suitable for receiving processing components.

26. A sensor according to claim 24, characterized by the fact that it comprises two covers (150) designed to hold stationary the printed circuits (210, 220) carrying the electrodes (212, 222, 223, 224, 225) on respective ones of the opposite main faces of the spacer (230).

27. A sensor according to claim 24, characterized by the fact that the base of the spacer (230) is provided with an electrical connector (130).

28. A sensor according to claim 23, characterized by the fact that the spacer is formed of beams (232, 234, 238) defining a chamber suitable for receiving processing components.

29. A sensor according to claim 23, characterized by the fact that it comprises two covers (150) designed to hold stationary the printed circuits (210, 220) carrying the electrodes (212, 222, 223, 224, 225) on respective ones of opposite main faces of the spacer (230).

30. A sensor according to claim 23, characterized by the fact that the base of the spacer (230) is provided with an electrical connector (130).

31. A sensor according to claim 22, characterized by the fact that the spacer is formed of beams (232, 234, 238) defining a chamber suitable for receiving processing components.

32. A sensor according to claim 31, characterized by the fact that longitudinal beams (232, 234) are provided with studs (2320, 2340) suitable for resting on an inside surface of a recess defined by the cage (50) secured to the column.

33. A sensor according to claim 32, characterized by the fact that the beams (232, 234, 238) carry two pairs of positioning studs (2380, 2382) for printed circuits (210, 220) carrying the electrodes (212, 222, 223, 224, 225).

34. A sensor according to claim 32, characterized by the fact that it comprises two covers (150) designed to hold stationary the printed circuits (210, 220) carrying the electrodes (212, 222, 223, 224, 225) on respective ones of opposite main faces of the spacer (230).

35. A sensor according to claim 32, characterized by the fact that the base of the spacer (230) is provided with an electrical connector (130).

36. A sensor according to claim 31, characterized by the fact that the beams (232, 234, 238) carry two pairs of positioning studs (2380, 2382) for printed circuits (210, 220) carrying the electrodes (212, 222, 223, 224, 225).

37. A sensor according to claim 36, characterized by the fact that it comprises two covers (150) designed to hold stationary the printed circuits (210, 220) carrying the electrodes (212, 222, 223, 224, 225) on respective ones of opposite main faces of the spacer (230).

38. A sensor according to claim 36, characterized by the fact that the base of the spacer (230) is provided with an electrical connector (130).

39. A sensor according to claim 31, characterized by the fact that it comprises two covers (150) designed to hold stationary the printed circuits (210, 220) carrying the electrodes (212, 222, 223, 224, 225) on respective ones of opposite main faces of the spacer (230).

40. A sensor according to claim 31, characterized by the fact that the base of the spacer (230) is provided with an electrical connector (130).

41. A sensor according to claim 22, characterized by the fact that it comprises two covers (150) designed to hold stationary the printed circuits (210, 220) carrying the electrodes (212, 222, 223, 224, 225) on respective ones of opposite main faces of the spacer (230).

42. A sensor according to claim 41, characterized by the fact that the two covers (150) are identical.

43. A sensor according to claim 31, characterized by the fact that the covers (150) are held stationary by snap-fastening.

44. A sensor according to claim 42, characterized by the fact that a first side edge of each cover (150) is provided with a substantially-central snap-fastening tooth (156) organized to come into engagement with a facing edge of the other cover, and a second side edge of each cover is provided with two snap-fastening teeth (157, 158) situated apart, and organized to come into engagement with the facing edge of the other cover.

45. A sensor according to claim 42, characterized by the fact that the base of the spacer (230) is provided with an electrical connector (130).

46. A sensor according to claim 41, characterized by the fact that the covers (150) are held stationary by snap-fastening.

47. A sensor according to claim 46, characterized by the fact that a first side edge of each cover (150) is provided with a substantially-central snap-fastening tooth (156) organized to come into engagement with a facing edge of the other cover, and a second side edge of each cover is provided with two snap-fastening teeth (157, 158) situated apart, and organized to come into engagement with the facing edge of the other cover.

48. A sensor according to claim 46, characterized by the fact that the base of the spacer (230) is provided with an electrical connector (130).

49. A sensor according to claim 41, characterized by the fact that the covers (150) are held stationary by snap-fastening.

50. A sensor according to claim 41, characterized by the fact that the base of the spacer (230) is provided with an electrical connector (130).

51. A sensor according to claim 41, characterized by the fact that a first side edge of each cover (150) is provided with a substantially-central snap-fastening tooth (156) organized to come into engagement with a facing edge of the other cover, and a second side edge of each cover is provided with two snap-fastening teeth (157, 158) situated apart, and organized to come into engagement with the facing edge of the other cover.

52. A sensor according to claim 51, characterized by the fact that the base of the spacer (230) is provided with an electrical connector (130).

53. A sensor according to claim 22, characterized by the fact that the base of the spacer (230) is provided with an electrical connector (130).

54. A sensor according to claim 15, characterized by the fact that the electrodes (212, 222, 223, 224, 225, 310, 312) are planar and perpendicular to the axis of rotation.

55. A sensor according to claim 1, characterized by the fact that each electrode (212; 222, 223, 224, 225) of the stator element is surrounded by a guard electrode (214).

* * * * *